Patented Dec. 20, 1938

2,140,519

UNITED STATES PATENT OFFICE 2,140,519

CHLOROHYDROCARBON EMULSION

Arthur A. Elston, Niagara Falls, N. Y., assignor to E. I. du Pont de Nemours & Company, Wilmington, Del., a corporation of Delaware No Drawing. Application July 27, 1936, Serial No. 92,944

15 Claims. (Cl. 252—6)

This invention relates to the preparation of emulsions of chlorohydrocarbons, particularly emulsions of chlorinated hydrocarbons in water. It is more especially concerned with the preparation of emulsions of tetrachlorethane in water yielding emulsions which are relatively stable and will remain so, without separation into their constituents, for relatively long periods of time.

Chlorohydrocarbons, especially tetrachlorethane, $C_2H_2Cl_4$, have come into prominence in recent years as effective weed killing agents. In the eradication of weeds such as the common dandelion from gardens, lawns, golf courses, etc., the chlorinated hydrocarbons, and more especially, tetrachlorethane, have been found most effective. For weed killing purposes it is now usual to utilize tetrachlorethane directly as it comes from the manufacturing process and without purification or stabilization. However, before use in weed killing the tetrachlorethane is usually filtered to free it of solid material and it may sometimes be dried by treatment with a drying agent.

When a chlorinated hydrocarbon such as tetrachlorethane is applied in undiluted form to a lawn containing dandelions or other weeds which are to be killed it has been found that not only will the weeds be killed but the grass will also be damaged or destroyed. Accordingly, when the chlorinated hydrocarbons are utilized in undiluted form for weed killing the liquid is applied directly to the crown of the dandelion or surface of the weed to be destroyed. Care is taken to prevent contact of the undiluted chlorohydrocarbon with the grass. In efforts to permit the sprinkling of a lawn or other grass plot uniformly with a liquid containing a chlorinated hydrocarbon which would operate to destroy only the dandelions or other noxious weeds and would not deleteriously affect the grass, it has been suggested to prepare emulsions of chlorohydrocarbons, such as tetrachlorethane, in a neutral fluid such as water and apply the emulsion to the grass plot. In this way a liquid which may contain from 1 to 10% of chlorinated hydrocarbon will be applied fairly uniformly over the surface of the lawn or other grass plot and the concentration of the chlorohydrocarbon is such that only the weeds will be destroyed.

While the art has sought to prepare emulsions of chlorinated hydrocarbons such as tetrachlorethane and water, up until now it has not been possible to prepare emulsions which would remain stable for substantial periods of time. Tetrachlorethane is particularly difficult to emulsify in water, as a result of its extremely high specific gravity, and even when the concentration of chlorohydrocarbon in the emulsion was relatively high, agitation and mixing over a prolonged period of time was essential to produce even a small degree of emulsification. By the use of the novel emulsifying agents which form the subject matter of this invention, it is possible to reduce the interfacial tension between the surfaces of tetrachlorethane and water to such an extent that practically spontaneous emulsification occurs. This represents a marked advance in the art and avoids the necessity for prolonged agitation.

Moreover, by the use of the novel emulsifying agents hereinafter more fully described, it has been found possible to prepare tetrachlorethane in water emulsions of relatively high chlorohydrocarbon strength. Thus, I have prepared without difficulty emulsions of tetrachlorethane and water having a concentration of 90% or more of the chlorohydrocarbon. Previously when attempts were made to prepare emulsions of tetrachlorethane and water the results of even prolonged and laborious agitation of the two components were emulsions of very low chlorohydrocarbon concentration.

As previously stated the very transitory emulsions of tetrachlorethane and water which the art has been able to prepare also possess the characteristic of but very limited stability. By the use of my novel emulsifying agents, not only are emulsions of tetrachlorethane in water of relatively high chlorohydrocarbon concentration readily and quickly prepared, but such emulsions are stable for prolonged periods of time. It has been found possible to prepare emulsions of tetrachlorethane in water with chlorohydrocarbon concentrations as low as 5% or even less, which, nevertheless, would remain stable for periods of time up to two hours. Stabilities of this order have never before been obtained in the art as it is well known that chlorohydrocarbon emulsions, especially those of the lower concentrations, have been most difficult to stabilize and have always separated into their constituent parts upon standing within a few moments.

In use it may be found most suitable to store the chlorohydrocarbon containing dissolved therein my novel emulsifying agents and to prepare the desired emulsion, in the desired concentration, by mixing and agitating the necessary quantity of the chlorohydrocarbon and water immediately before use. My improved emulsifying agents must accordingly be such that they will not tend to corrode the metallic containers unduly during the substantial periods of time that the chlorohydrocarbon may be stored prior to use in the preparation of emulsions. It will be appreciated that very frequently the cholorohydrocarbon may be stored for periods of a year or more, and it is essential that my emulsifying agents, in addition to rendering relatively dilute emulsions of the chlorohydrocarbon in water substantially stable, should not bring about undue corrosion in the container or cause changes in the chlorohydrocarbon which might tend to cause such corrosion.

Accordingly, it is one of the objects of this invention to prepare emulsions of chlorohydrocarbons in water, more particularly emulsions of tetrachlorethane in water, which will be relatively stable and will remain so for substantial periods of time no matter how dilute the concentration of the chlorohydrocarbon. This object of my invention also contemplates the preparation of the emulsions specified without the necessity for agitating the two constituents for a long period of time or other laborious or expensive intermingling of the constituents of the emulsion.

It is another object of this invention to utilize in the preparation of stable emulsions of chlorohydrocarbons in water, particularly tetrachlorethane in water, certain novel emulsifying agents. It is moreover, still another object of this invention to utilize as these emulsifying agents substances which will not unduly corrode the metallic container in which the chlorohydrocarbon may be stored after addition of the emulsifying agent thereto. These and still other objects of my invention will be apparent from the ensuing disclosure of a preferred method and means for preparing these emulsions of extreme stability.

I have found that when an emulsifying agent such as lauryl amine, $C_{12}H_{25}NH_2$, is utilized as the emulsifying agent it is possible to prepare emulsions of tetrachlorethane in water which will be stable for relatively long periods of time. The emulsions with which this novel emulsifying agent will be found to yield most beneficial results will normally have chlorohydrocarbon concentrations of 10% or below. Emulsions of such dilution are normally very transitory and usually settle into two layers, one of water and the other of chlorohydrocarbon after but a very short period of time. By the use of lauryl amine it is possible to render these emulsions stable for periods of time up to two hours. With relatively more concentrated solutions of tetrachlorethane in water, such as emulsions containing 60% or more of tetrachlorethane, the lauryl amine renders the resulting emulsions exceedingly stable and they may be stored for months without any separation into their constituent elements.

When utilizing lauryl amine as the emulsifying agent I have found, surprisingly enough, that if the lauryl amine is added to the chlorohydrocarbon and the emulsion immediately prepared, the lauryl amine will not exhibit the superior emulsifying properties characteristic of the agent. While agitation will emulsify the tetrachlorethane and water, the resulting emulsion will not be very stable and will readily separate upon standing.

However, if the lauryl amine is added to the tetrachlorethane and the solution allowed to age for a period of time ranging from two weeks to one month it will then be found that when emulsions of tetrachlorethane in water are prepared such emulsions possess the marked stability characteristic of my invention. It is desired to point out that the lauryl amine is not immediately effective as an emulsifying agent but after its addition to a chlorohydrocarbon such as tetrachlorethane that chlorohydrocarbon must be permitted to stand or age for a certain period of time before the marked emulsifying action of the lauryl amine becomes apparent.

While the true explanation of this surprising phenomenon, resulting in the necessity for permitting the tetrachlorethane to stand or age after addition of the amine before emulsions of satisfactory stability can be prepared is not fully understood, it appears that before satisfactory emulsifying action can be obtained the lauryl amine must be converted to lauryl amine hydrochloride, $C_{12}H_{25}NH_2 \cdot HCl$. Although I have not definitely proved that any changes occur in the lauryl amine during the period of standing it appears that the amine reacts with free hydrochloric acid or other acid in the chlorohydrocarbon and is thereby converted to the hydrochloride. Thus it appears that it is the hydrochloride which functions as the agent which yields emulsions of superior stability. It is desired to point out, however, that this is merely a theory, and the scope of the invention is not to be determined in accordance with the correctness or incorrectness of this theory.

When utilizing lauryl amine as the emulsifying agent an amount up to 5% of this amine, based on the weight of the chlorohydrocarbon, is added to the tetrachlorethane. Usually from 1 to 4% of the lauryl amine will be found to yield most satisfactory results. The chlorohydrocarbon is then preferably allowed to age for periods of time up to one month. At the end of this period the tetrachlorethane may be agitated with water in any desired relative proportions and the resulting emulsions will be relatively stable for periods ranging up to four months in the case of those having fairly high chlorohydrocarbon concentrations. While emulsions containing my novel emulsifying agent, prepared as described, may tend to "cream" somewhat upon standing, i. e., the emulsified particles may tend to drop to the bottom of the container, there will be no separation or splitting of the emulsion into its constituents for a reasonable length of time.

Since it appears necessary that the lauryl amine be at least partially converted to lauryl amine hydrochloride during the standing or aging process before emulsions of superior stability can be obtained, it would seem that lauryl amine hydrochloride, $C_{12}H_{25}NH_2 \cdot HCl$, if added directly as an emulsifying agent might function as such immediately, and that aging would not be necessary. I have found that when from 1 to 5% by weight of lauryl amine hydrochloride, this amount being based on the weight of the tetrachlorethane, is added to that chlorohydrocarbon it does function satisfactorily as an emulsifying agent and emulsions of superior stability can be obtained immediately and without the necessity for allowing the solution first to stand or age. However, it has also been observed that during storage of solutions of tetrachlorethane containing dissolved therein lauryl amine hydrochloride, there is a tendency for corrosion of the metal of the metallic storage vessel to occur, which tendency is not present to any appreciable extent when solutions of tetrachlorethane containing lauryl amine dissolved therein are stored. Accordingly, the use of lauryl amine hydrochloride alone as one of my emulsifying agents, while entirely feasible where the emulsions are to be immediately prepared, where the tetrachlorethane is to be stored in non-metallic vessels or where the occurrence of corrosion would not be detrimental, is not to be recommended wherever the corrosion of metallic containers upon standing is regarded as unsatisfactory.

Although as previously indicated the action of lauryl amine when used as the emulsifying agent appears to be to form the hydrochloride in the chlorohydrocarbon no appreciable corroding effect has been observed when solutions of tetrachlorethane containing the amine are stored in metallic containers. While some slight corrosion may occur during prolonged periods of storage, the amount of such corrosion is so slight that it may be entirely disregarded.

It has also been found that if both lauryl amine and lauryl amine hydrochloride are added to the tetrachlorethane and utilized as emulsifying agents the amount of corrosion of the metallic container, during the period the tetrachlorethane is stored, is materially lessened. Thus, an emulsifying agent consisting of 1% of lauryl amine and 1% of lauryl amine hydrochloride will yield less corrosion than one consisting of 2% lauryl amine hydrochloride alone. My invention, therefore, also comprises the use of both lauryl amine and lauryl amine hydrochloride as emulsifying agents in a single batch of tetrachlorethane, the relative amounts of each of these agents being so proportioned as to limit the amount of corrosion of the metallic container occurring during the storage period to any permissible amount.

In the preparation of emulsions of tetrachlorethane containing in solution my novel emulsifying agents and water no unusual precautions are necessary. The best results are obtained, however, by agitating the chlorohydrocarbon with the smallest amount of water that can be used and still obtain a satisfactory emulsion. As previously indicated, compositions comprising 90% tetrachlorethane and 10% water will readily and quickly emulsify when the novel emulsifying agents are present. After forming this relatively concentrated emulsion it should be diluted with water to the desired concentration. This method of preparing the more dilute (from the standpoint of chlorohydrocarbon concentration) emulsions has the advantage that smaller quantities of the liquids can be agitated to prepare the initial emulsions. The speed with which the tetrachlorethane emulsifies when agitated with water is so great that the tetrachlorethane seems to be converted into a soluble form by the presence therein of the emulsifying agents lauryl amine or lauryl amine hydrochloride or both. In addition to enhancing the stability of the resulting emulsions, these agents appear to lower the interfacial tension of the surfaces of the liquids to such an extent that practically spontaneous formation of the emulsion occurs. This effect is observable even with very high chlorohydrocarbon concentrations, concentrations such as 90% or even higher.

The ability to prepare dilute emulsions of tetrachlorethane and water by first forming concentrated emulsions and then reducing them to any desired concentration by the addition of water is also a remarkable advantage accruing to the use of the novel emulsifying agents specified. As contrasted with the methods now known to the art for the preparation of dilute emulsions from emulsions of higher chlorohydrocarbon concentration, which require considerable agitation and shaking, the dilution of concentrated emulsions formed in accordance with my method to those of more dilute concentrations, such as from 1 to 5% chlorohydrocarbon, takes place practically spontaneously and with the necessity of but very little additional agitation or shaking.

Another important advantage of my invention is the ability to store without corroding the metallic storage vessels solutions of pure tetrachlorethane containing my novel emulsifying agents and to prepare the desired emulsions of any desired concentration, quickly and without the necessity for prolonged agitation at the place where those emulsions are to be used. In shipping it is not necessary to ship considerable quantities of water as when shipping emulsions prepared by methods now known as substantially pure tetrachlorethane may be shipped and converted by the addition of the requisite water to an emulsion of any desired concentration at the point where the emulsion is to be used for weed killing or other purposes. This is indeed a remarkable advantage and is the result of the ease with which emulsions of tetrachlorethane and water may be prepared, attributable to the remarkable ability of my novel emulsifying agents to lower the interfacial surface tension to below a very low figure, probably to below one dyne per square centimeter.

As examples of stable emulsions of superior stability and of my process for preparing them the following may be given:—

*Example 1*

A solution of lauryl amine in tetrachlorethane was prepared by dissolving 10 grams of lauryl amine in 500 grams of crude tetrachlorethane. Before addition of the lauryl amine, the tetrachlorethane had been agitated with soda-lime until it was free from acidity. The solution of lauryl amine in tetrachlorethane was then stored in a metal container formed of bright sheet metal.

Immediately after preparation, 25 grams of this solution were shaken with approximately 10% of its weight of water. In spite of vigorous and continuous agitation no emulsion of the tetrachlorethane in water could be formed.

The solution was then allowed to stand for three weeks. At the end of this period 25 grams of tetrachlorethane containing the emulsifying agent when shaken with approximately 2.5 grams of water immediately gave a tetrachlorethane in water emulsion. Portions of this concentrated emulsion were then diluted to a concentration of 5% chlorohydrocarbon by the simple addition of water. But very little additional agitation was necessary, merely mixing the emulsions with the added water being sufficient. The resulting emulsions of 5% chlorohydrocarbon concentration were stable for periods of time ranging from 15 to 30 minutes.

Similar tests after 11 weeks storage of the tetrachlorethane solution gave similar stable concentrated emulsions. Upon dilution of the resulting concentrated emulsions to 5% chlorohydrocarbon concentration by the addition of water, the resulting dilute solutions were found to be stable for more than two hours. At the end of 11 weeks the metal of the container was substantially free of corrosion.

*Example 2*

A solution of tetrachlorethane was prepared following the procedure described in Example 1 and containing the same amount of lauryl amine. However, crude lauryl amine was utilized in place of the substantially pure product employed in Example 1.

The results were substantially identical with those described in Example 1. When fresh, no emulsion could be formed no matter how vigorously the tetrachlorethane and water were agitated. After three weeks storage 5% emulsions were found to be stable for 15 minutes, while after 11 weeks emulsions of the same concentration were stable for more than two hours. No appreciable corrosion of the container in which the tetrachlorethane solution was stored was apparent after storage for eleven weeks.

It is thus evident that regardless of whether pure lauryl amine or crude lauryl amine is utilized, a period of aging or storage is necessary before emulsions, especially those of satisfactory stability, can be prepared.

Example 3

A solution of lauryl amine hydrochloride was prepared by dissolving 10 grams of the hydrochloride in 500 grams of crude tetrachlorethane.

Immediately upon preparation of the solution, stable 5% emulsions could be prepared by preparing concentrated solutions by agitation with a relatively small quantity of water and then diluting these concentrated emulsions down to 5% tetrachlorethane concentration. The dilute 5% emulsions were stable for periods of time ranging from 40 to 60 minutes.

After the solution of tetrachlorethane containing dissolved therein lauryl amine hydrochloride had been stored for three weeks it was found that 5% emulsions prepared by dilution of more concentrated emulsions were still stable for periods of time ranging from 40 to 60 minutes. After storage for 11 weeks it was found that 5% emulsions were stable for periods up to two hours but some settlement or "creaming" of such emulsions occurred. The corrosion of the tin container in which the tetrachlorethane emulsion had been stored for 11 weeks was evident after that time.

Example 4

A solution was prepared in accordance with the procedure of Example 1 utilizing 7.5 grams of lauryl amine hydrochloride and 2.5 grams of pure lauryl amine in place of the 10 grams of free amine utilized in that example.

After a period of storage of but one day the resulting solution gave stable concentrated emulsions. Emulsions of 5% chlorohydrocarbon concentration were prepared by dilution of the more concentrated solutions and these were found to be stable for approximately 25 minutes.

After storage for a period of 11 weeks the tetrachlorethane solution gave stable concentrated emulsions practically immediately upon mixing the tetrachlorethane and water. Emulsions of concentrations ranging from 1 to 5%, prepared by dilution of the more concentrated solutions, were found to be stable for periods up to one hour. The tin container in which the solution had been stored during the 11 weeks storage period was found to be but slightly corroded.

Example 5

Three solutions of tetrachlorethane containing respectively 1.3 grams, 2 grams and 4 grams of lauryl amine hydrochloride per 100 grams of tetrachlorethane were prepared. When emulsions of 80% tetrachlorethane concentration in water were prepared from each solution these concentrated solutions were found to be stable. No prolonged agitation was necessary to form the emulsions as they formed practically spontaneously upon mixing the tetrachlorethane and water.

Emulsions of 5% chlorohydrocarbon strength were prepared by diluting portions of each of these 80% emulsions by the addition of water. The stability of the resulting 5% emulsion, formed from the tetrachlorethane which contained 1.3 grams of lauryl amine hydrochloride per 100 grams of solution, was approximately 10 minutes. That of the dilute (5%) emulsion formed from the tetrachlorethane containing 2 grams of lauryl amine hydrochloride per 100 grams of chlorohydrocarbon was approximately 50 minutes. The stability of the dilute emulsion resulting from the tetrachlorethane solution containing 4 grams of lauryl amine hydrochloride per 100 grams of the chlorohydrocarbon was found to be greater than that of either of the other two emulsions since complete breaking did not occur until the emulsion had stood for periods of time well over 50 minutes.

While I have described my invention in detail I do not desire that that invention be regarded as limited to the precise details disclosed as some of the ingredients mentioned may be omitted, other equivalent ingredients may be employed, changes may be made in the proportions of the constituents of the emulsions or changes may be made in the manner of intermixing these constituents without departing from the spirit or principles of the invention. Since various changes may be made in both the composition of my emulsions and in the method of preparing them which will still fall within the purview of my invention I do not desire that the invention be restricted to the details given merely as illustrative but that it be construed in accordance with the annexed claims.

I claim:

1. A process for preparing stable emulsions of tetrachlorethane in water which comprises adding lauryl amine hydrochloride to tetrachlorethane and then agitating said resulting solution with water in quantity sufficient to form a relatively stable emulsion of tetrachlorethane in water of any desired chlorohydrocarbon concentration.

2. A method of preparing stable emulsions of tetrachlorethane in water which comprises adding to tetrachlorethane lauryl amine and lauryl amine hydrochloride as an emulsification agent, and then agitating said resulting solution with water in amount sufficient to form a relatively stable emulsion of any desired chlorohydrocarbon concentration.

3. A process of preparing a stable emulsion of tetrachlorethane in water which comprises adding lauryl amine to tetrachlorethane, aging said resulting solution by permitting it to stand for at least two weeks and then agitating said resulting aged solution with water in amount sufficient to yield a relatively stable emulsion of tetrachlorethane in water of any desired chlorohydrocarbon concentration.

4. A method of preparing a stable emulsion of tetrachlorethane in water which comprises adding up to 5% of lauryl amine to tetrachlorethane, aging said resulting solution by permitting it to stand for a period of at least two weeks, and then agitating said resulting aged solution with water in amount sufficient to yield a relatively stable tetrachlorethane in water emulsion of any desired chlorohydrocarbon concentration.

5. A method of preparing a stable emulsion of tetrachlorethane in water which comprises adding from 1 to 4% of lauryl amine to tetrachlorethane, aging said resulting solution by permitting it to stand for at least two weeks, and then agitating said resulting aged solution with water in amount sufficient to form a relatively stable tetrachlorethane in water emulsion of any desired chlorohydrocarbon concentration.

6. A method of preparing a stable emulsion of tetrachlorethane in water which comprises adding up to 5% of lauryl amine hydrochloride to tetrachlorethane and then agitating said resulting solution with water in sufficient amount to form a relatively stable tetrachlorethane in water emulsion of any desired chlorohydrocarbon concentration.

7. A method of forming a stable emulsion of tetrachlorethane in water which comprises adding to tetrachlorethane from 1 to 4% of lauryl amine hydrochloride and then agitating said resulting solution with water in sufficient amount to form a relatively stable tetrachlorethane in water emulsion of any desired chlorohydrocarbon concentration.

8. A method of forming a stable tetrachlorethane in water emulsion of relatively low chlorohydrocarbon concentration which comprises dissolving lauryl amine in tetrachlorethane, aging said resulting solution by permitting it to stand for a period of time of at least two weeks in duration, agitating said resulting solution with a relatively small amount of water in order to form a permanent tetrachlorethane in water emulsion of relatively high chlorohydrocarbon concentration, adding a sufficient quantity of water to said concentrated emulsion to form an emulsion of low chlorohydrocarbon concentration having any desired tetrachlorethane content, and then agitating said mixture of concentrated emulsion and water in order to form a stable emulsion of relatively low chlorohydrocarbon concentration.

9. A method of forming a stable tetrachlorethane in water emulsion of relatively low chlorohydrocarbon concentration which comprises dissolving lauryl amine hydrochloride in tetrachlorethane, agitating said resulting solution with a relatively small amount of water in order to form a permanent tetrachlorethane in water emulsion of relatively high chlorohydrocarbon concentration, adding a sufficient quantity of water to said concentrated emulsion to form an emulsion of low hydrocarbon concentration having any desired tetrachlorethane content, and then agitating said mixture of concentrated emulsion and water in order to form a stable emulsion of relatively low chlorohydrocarbon concentration.

10. A stable emulsion of tetrachlorethane in water which contains lauryl amine as an emulsification agent, said lauryl amine having been aged in the presence of tetrachlorethane for a period of at least two weeks.

11. A stable emulsion of tetrachlorethane in water which contains lauryl amine hydrochloride as an emulsification agent.

12. A stable emulsion of tetrachlorethane in water which contains, as an emulsification agent, lauryl amine and lauryl amine hydrochloride.

13. A stable emulsion of tetrachlorethane in water which contains from 1 to 4% of lauryl amine as an emulsification agent, said lauryl amine having been aged in the presence of tetrachlorethane for a period of at least two weeks.

14. A stable emulsion of tetrachlorethane in water which contains from 1 to 4% of lauryl amine hydrochloride as an emulsification agent.

15. A stable emulsion of tetrachlorethane in water which contains from 1 to 4% of a mixture of lauryl amine and lauryl amine hydrochloride as an emulsification agent.

ARTHUR A. ELSTON.